June 16, 1964 R. E. SPENCER ET AL 3,137,787

DIGITAL DIFFERENTIAL ANALYZERS

Filed May 12, 1960 2 Sheets-Sheet 1

Inventors
R.E. Spencer
R. Voles
By Glascock Downing & Seebold
Attys

Inventors
R. E. Spencer
R. Voles
By Glascock Downing & Seebold
Attys.

3,137,787

DIGITAL DIFFERENTIAL ANALYZERS

Rolf Edmund Spencer, West Ealing, London, and Roger Voles, Chiswick, London, England, assignors to Electric & Musical Industries Limited, Hayes, England, a company of Great Britain Filed May 12, 1960, Ser. No. 28,791
Claims priority, application Great Britain May 14, 1959
8 Claims. (Cl. 235—152)

Figure 1:
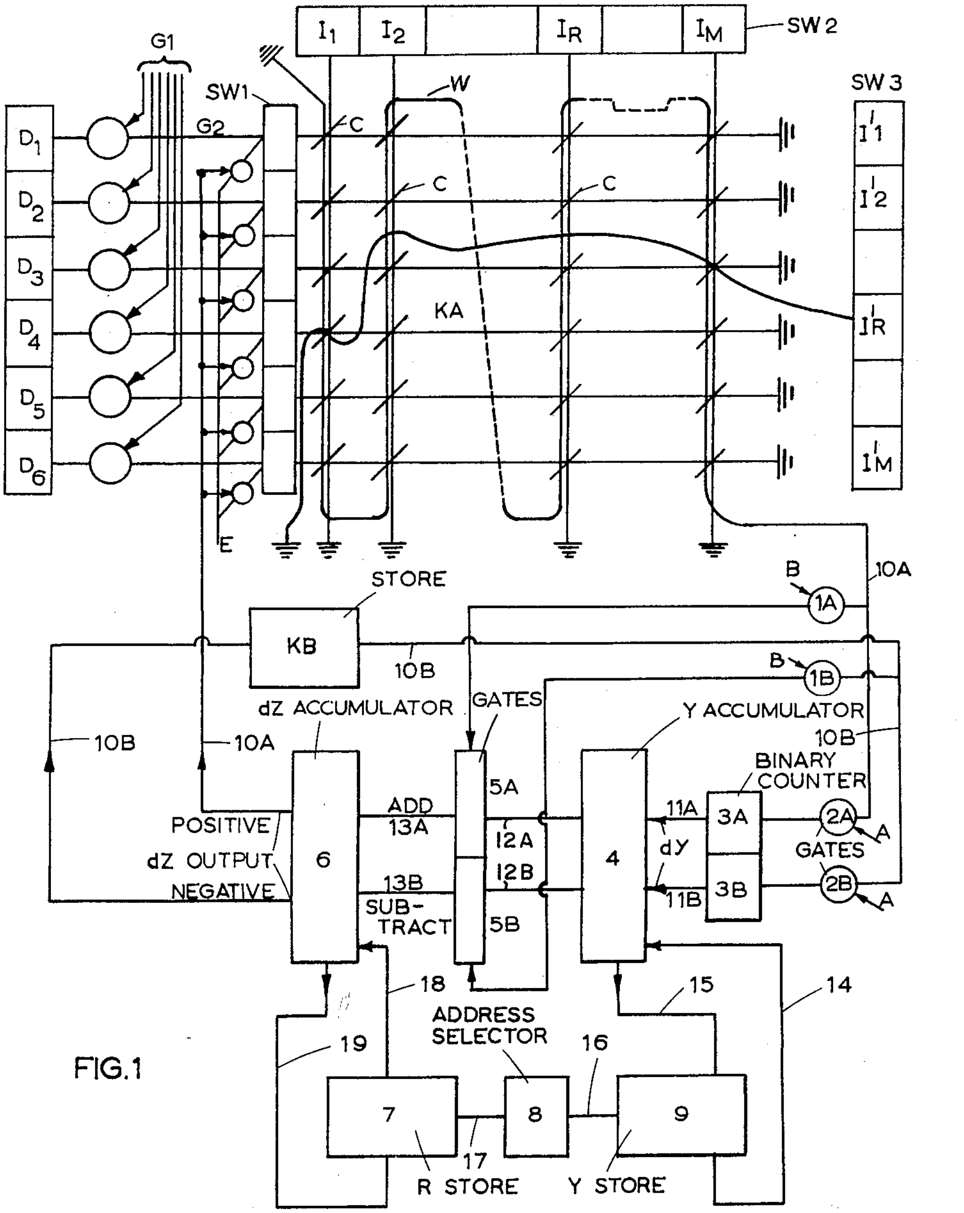

This invention relates to digital differential analyzers.

In solving differential equations a number of consecutive steps of integration are effected. Thus the basic component of a differential analyzer is an integrator. The integrator has two inputs namely $dx$ and $dy$ and one output $dz$ where the relationship between $x$, $y$ and $z$ is $dz=Kydx$, K being a constant dependent upon the physical properties of the integrator. In the well known mechanical wheel and disc integrator the $dx$ input is translated into rotation of the wheel, the $dy$ input into radial movement of the wheel relative to the disc and the $dz$ output is represented by the consequent rotation of the disc. The corresponding integrator of a digital differential analyzer comprises two accumulators and gating means for transferring additively the contents of the first accumulator to the second accumulator without removing said contents from said first accumulator. The first accumulator has as its input increments $dy$ which are summed to give the instantaneous value of $y$, $dx$ inputs are applied to the gating means and are therefore instructions to transfer the instantaneous value of $y$ to the second accumulator. The second accumulator contains a number R to which the instantaneous value of $y$ is added at each transfer. The second accumulator has of course, a certain specified capacity and when this capacity is reached said accumulator will overflow, generating a $dz$ pulse, the amount by which the particular $R+y$ value exceeds the capacity of the second accumulator remaining in said accumulator as the new R number. It will be appreciated that $dz$ is represented by the output rate from the second accumulator, which rate is dependent upon $y$ and the rate of $dx$. If a digital system is employed, every time the capacity of the second accumulator is exceeded a "1" is generated as output whereas if on the transfer of a $y$ number the capacity is not reached a "0" is generated. Thus the $dz$ output is in the form of "1's" and "0's" is the value of $dz$ being determined by the rate of the "1's".

Two types of digital differential analyzers have been proposed. The first type is known as a space distributed analyzer and employs a plurality of interconnected integrators such as the one described above, the $dz$ outputs of various integrators being fed to form either $dx$ or $dy$ inputs of succeeding ones. The second type is known as a time multiplex analyzer in which an economy of components and space is attained by using one adder alone to service all integrators. In order to employ only one adder it will be appreciated that some form of store, usually a magnetic drum, is required for temporarily storing the values of $y$, $dz$ and R until they are required to be applied to the adder. Either type of analyzer can be operated in serial or parallel mode and using a binary, ternary or other system.

Usually in a time multiplex analyzer operated in serial mode the $dz$ outputs from the common adder are stored in a serial store from which they can be extracted for use as $dx$ or $dy$ inputs in future periods of integration. Usually also the inputs for use in a particular elementary integration, say the $I_R$th integration are extracted whilst the $I_{R-1}$th integration is taking place. For example, one cycle of the analyzer may comprise about 100 elementary integrations from which there arise respective $dz$ elements, having values "1" or "0". The $dz$ store must therefore have a capacity for a large number of $dz$ elements, whereas the maximum number of such $dz$ elements which may be required to contribute to any one elementary integration is small, usually less than 5. Depending on the nature of the problem to be solved, the $dz$ elements required for one elementary integration may arise from any one or more of the other elementary integrations in a cycle and may therefore be in any position in the $dz$ element store. It is usual therefore to scan a $dz$ element store preparatory to each elementary integration in order to select the required $dz$ elements but the scanning process is a severe limitation on the speed of operation of the analyzer since it very often takes a much longer time than that required to process an integrator.

The object of the present invention is to provide a digital differential analyzer of the time multiplex type having an improved $dz$ element store whereby the disadvantage referred to above can be substantially removed.

According to the present invention there is provided a digital differential analyzer of the time multiplex type comprising integrating means, a store including an array of storage elements arranged in groups corresponding to different elementary integrations, means for deriving signals from storage elements in the different groups in order according to a cycle of elementary integrations and for applying the derived signals to the integrating means, and means for applying output signals from the integrating means to selected storage elements in the different groups according as the signals are required for subsequent elementary integrations involving signals in the respective groups of storage elements.

It will be appreciated that, by virtue of the invention, the output signals from the integrating means are distributed in space according to the order in which they will be required in subsequent elementary integrations so that no more time need be occupied in deriving the signals needed for the elementary integrations than that which is required to service an integrator. The invention imparts to a time multiplex analyzer some of the advantages of a space distributed analyzer.

The array of storage elements may comprise an array of magnetic core elements and the means for applying output signals from the integrating means to the storage elements may comprise conductors which are coupled selectively with magnetic core elements of the different groups according to a pre-arranged cycle of elementary integrations. A particular conductor may be coupled with magnetic core elements in more than one group according as a particular $dz$ element is required to take part in more than one subsequent elementary integration in a cycle.

Figure 2:
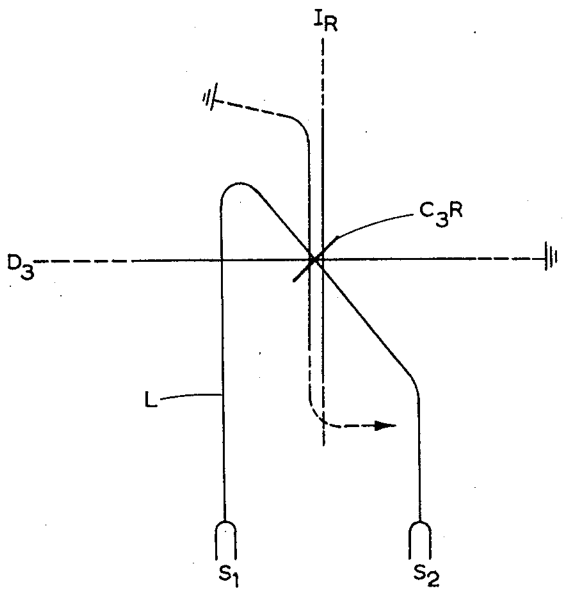

In order that the invention may be clearly understood and readily carried into effect it will now be more fully described with reference to the accompanying drawings, in which:

FIGURE 1 shows diagrammatically a programming system for use in a digital differential analyzer in accordance with an embodiment of the invention, and FIGURE 2 shows diagramatically a portion of a programming system adapted to be employed in conjunction with a plugboard whereby greater versatility can be achieved.

Referring to FIGURE 1 the invention is shown by way of example, as applied to an analyzer operating in ternary mode with values 1, 0, and −1. The representation of the integrator is largely block schematic since such devices are now well known to those skilled in the art, the construction of the magnetic store for the *dz* output elements provided by the integrator is shown in more detail. The magnetic store for the *dz* output elements is arranged in two planes, one plane being used to store signals representing elements with positive significance and the other plane being used to store signals representing elements with negative significance. Only one plane is shown in detail in FIGURE 1 being denoted by the reference KA. The other plane is represented only by the rectangle KB, which will be assumed to include the auxiliary gates and other components of the plane. In order that the significance of the stores K for the *dz* elements can be fully appreciated the associated integrator will be briefly described. Each plane of the *dz* store comprises a planar array of magnetic cores, some individual cores being denoted by the reference C. The array in each plane has M columns of cores $I_1, I_2 \ldots I_M$, with six cores on each column, M being the number of elementary integrations in each cycle of integration, the cycle being performed many times, say several thousand times, in a single analysis. The elements which form the *dy* increment, and also the element which forms the *dx* increment for each elementary integration are in fact obtained from the *dz* store, being the *dz* output or outputs of one or more preceding elementary integrations. The initial values of *y* and R have of course to be established independently, but as known techniques may be employed to do so, the provision of the initial values of R and *y* will not be further described. The binary elements of each *dy* increment are taken from the *dz* store via either the conductor 10A or 10B according as the increment is positive or negative and during their transfer the gates 2A and 2B are opened by pulses A. The successive *dy* increments are counted in the binary counters 3A and 3B and corresponding binary code digits are applied via the channels 11A and 11B to the *y* accumulator 4. The channel 11A leads to the "ADD" input of the accumultor 4, and the channel 11B leads to the "SUBTRACT" input of the accumulator 4. Each channel 11 may be a single conductor in the case where the binary digits are serially transferred to the accumulator 4, but when the equipment operates in the parallel mode each channel 11 represents a plurality of conductors, the number of paths depending on the number of binary digits employed. Similarly the channels marked 12, 13, 14, 15, 16, 17, 18, 19 etc., may represent a plurality of conductors if the transfer of binary digits between the units associated with a channel is in parallel mode.

For each elementary integration the *y* accumulator 4 has the appropriate current value of *y*, either positive or negative, applied to it from the *y* store 9 by means of channel 14, the incremented *y* value is withdrawn from 4 after each elementary integration has been completed and is returned to the *y* store 9 by means of the binary digit channel 15. In this way the *y* value appropriate to each integration is stored until it is again required for a further elementary integration. The store is a multilocation store and is associated with an address selector 8 whereby the particular *y* value required in any one elementary integration may be selected for application to the accumulator 4, and subsequently returned to the same location. The address selector 8 is common to the store 9 and another store 7 which is the residue or R store. The stores 7 and 9 and the address selector 8 will not be described in detail since these are well known to those skilled in the art. Both are binary stores. The appropriate binary coded quantity may be withdrawn or replaced in response to instructions received from the address selector 8.

The *y* accumulator 4 adds an increment *dy*, received from either the counter 3A or 3B to the appropriate value of *y*, and at the incidence of a *dx* increment at the gating circuits 5A and 5B which may each be single gates or a plurality of gates depending on whether the equipment is operating in serial or parallel mode, the current value of *y* is transferred via channel 13A or 13B to the *dz* accumulator 6 in accordance with the value of the corresponding *dx* increment. If *dx* is positive, that is derived from KA, the gate 5A is opened to transfer the current value of *y* which may be positive or negative to the "ADD" input of the accumulator and if *dx* is negative, that is derived from KB the gate 5B is opened to transfer the current value of *y* to the "SUBTRACT" input of the accumulator. It is assumed that the complements code is used to represent negative numbers in the accumulators 4 and 6 and store 9. The *dz* accumulator 6 has a finite capacity, and contains an R number as previously explained. The addition of a *y* element to the *dz* accumulator 6 results in the generation of a *dz* output. When the magnitude of the *y* element is such that in the accumulator 6 the sign digit changes from 0 to 1 a *dz* output is produced which represents a binary "1" digit, but if the magnitude of a *y* element does not cause the sign digit to change from 0 to 1 the *dz* output represents a binary "0" digit. Moreover the *dz* output, if it represents 1 is applied selectively to conductors 10A or 10B, for application to the stores KA or KB, depending on the sign of *dx* and of *y*. Thus if *dx* and *y* are both positive or both negative, any *dz* output representing "1" is applied to conductor 10A, otherwise it is applied to the conductor 10B. The circuit for selecting the appropriate conductors has not been shown, because many possible constructions will be apparent to those skilled in the art. The accumulator 6 may comprise a conventional binary accumulator capable of adding or subtracting. The "R" store 7 serves the same function in regard to the *dz* accumulator 6, as the store 9 serves in regard to the *y* accumulator 4 but the store 7 need only store positive numbers as the residue is always positive with the mode of operation described. The appropriate R number is applied via the channel 18 and extracted by means of the channel 19 for each elementary integration.

Referring now to the positive *dz* element store KA, the blocks labelled $D_1$ to $D_6$ indicate drive sources which can inject a fixed current into lines connected thereto. Five *dy* inputs, corresponding to $D_1$ to $D_5$, are available for each cycle of integration, the corresponding *dx* information being associated with $D_6$. The outputs from $D_1$ to $D_6$ are respectively laced, via a buffer stage SW1 to the rows of the planar array of magnetic cores. The columns $I_1$ to $I_M$ are associated with a column switch SW2 which injects a fixed current into each of columns $I_1$ to $I_M$ sequentially. The time of a switching cycle of SW2 is equal to the time of a cycle of integration, a current being injected into the columns in turn during successive elementary integrations of the cycle. Gating pulses $G_1$ can be applied sequentially to derive outputs from $D_1$ to $D_6$, the time of a cycle of such pulses being less than $1/M$ times the time of a switching cycle of switch SW2. At the end of $(R-1)$th elementary integration the *dy* and *dx* data for the Rth elementary integration are extracted. Hence at the end of said $(R-1)$th integration period the $I_R$ line is held at ½ read current whilst ½ read currents are applied from $D_1$ to $D_6$ to the rows of KA in turn by the sequential application of pulses at $G_1$. All cores of the array are laced with a winding W which has two output paths, one for *dy* via a gate operated by gating pulses A, and the other for *dx* via a gate operated by gating pulses B. During the application of $G_1$ pulses to $D_1$ to $D_5$ pulse A is applied so that any bits in the first five cores in the $I_R$ column are applied through the gate 2A opened by pulse A to the binary counter 3A to give the accumulated value of positive *dy* elements in binary digital form. This accumulated value of *dy* is then applied to the *y* accumulator 4 of the integrator of the apparatus to form the positive *dy* input for the Rth elementary integration, the appropriate value of *y* from the store 9 having been applied to the accumulator 4 in the correct time sequence with the application of the gated pulses $G_1$. During the application of pulse $G_1$ to open $D_6$ the pulse B is applied so that the bit in the sixth core of the $I_R$ column is applied for use in the integrator as the *dx* input for the Rth elementary integration. The elementary integration is then performed as indicated above. The store KB is operated in synchronism with KA, and components of the drive and read circuits may be common to the two stores.

At the end of the Rth elementary integration, the appropriate stage I′ of switching means SW3, in this case the $I'_R$ stage of said means SW3, is opened up to one half strength current. Each stage of the switching means is associated with a line which selectively laces the cores of the array. The lacing of corresponding lines in each plane being the same. In fact the I and I′ lacings would correspond in the two arrays and may be connected in series in corresponding pairs whilst the row conductor and W conductor, though corresponding in the two arrays, are separate such that there would be two leads corresponding to each of D and W. The selective lacing is shown only in the case of the $I'_R$ stage for simplicity and is represented by the conductor leading from the $I'_R$ stage of switch SW3. Thus as shown, a core in the $I_1$ column and a core in the $I_M$ column are set to ½ current at the end of the Rth elementary integration. At the same time the $(dz)_R$ output pulse is applied to the row conductors of K such that said conductors are held at ½ set current if the $(dz)_R$ pulse is "1" and at zero current if said $(dz)_R$ pulse is "0." This is effected by the provision of a constant voltage source E which is applied to the row conductors at the incidence of a gating pulse $G_2$ formed by the *dz* output pulse as shown. Thus whenever a *dz* output pulse is a "+1" the gating pulse $G_2$ is applied. Hence the $(dz)_R$ pulse is applied to particular cores in KA or in KB specified by the lacing which is representative of the programming. In an alternative arrangement the gating of constant voltage source E could be omitted, the *dz* output pulse being applied to switching means SW3 so that the appropriate I′ line is held at full set current if the *dz* pulse is a "1" and at zero current if said *dz* pulse is a "0."

Though separate "ADD" and "SUBTRACT" inputs are shown for the accumulators 4 and 6, subtracting may be achieved by applying any quantity which has to be subtracted to the "ADD" input in a complementer. In this event the conductors 10A or 10B to receive any carry output from the accumulator 6 can be selected in response to the value of the sign digit of the applied number, since a positive input can only produce a positive carry and vice versa.

The invention may be operated throughout on a binary system. When a binary system is employed in a digital differential analyser, in order to allow for signed integration, the signal corresponding to a "1" bit is taken to represent a positive increment whilst a "0" bit is taken to represent a negative increment. Thus in order to designate zero increment the notation ". . . 101010 . . ." is usually employed, that is switching occurs between the signal representing "1" and that representing "0." This introduces the well known phasing error.

If desired, in order to exploit the higher speed acquired when operation is in parallel mode the read out and summing of the bits in the first five cores of each column of magnetic cores can be effected simultaneously. This can be done by causing each bit to gate or inhibit a D.C. reference voltage to the end of a summing resistor to form an analogue voltage. The analogue voltage can be converted into parallel digital form by means of a ribbon beam coding tube, or alternatively by a fast serial coder of convenient form. If desired a whole period of integration can be used for this conversion by performing the read out for the Rth period of integration in the $(R-2)$th period of integration. The analogue voltage can then be held in a condenser and converted into digital form during the $(R-1)$th period of integration.

Referring now to FIGURE 2 there is shown a modification of the arrangement of FIGURE 1 in which one core of the $I_R$ column of cores is laced by a coupling conductor element L as shown. The coupling conductor element L is connected at its end to sockets $S_1$ and $S_2$ of a patchboard of plugboard. Each core of the array or arrays of cores is provided with a similar coupling conductor element and in order to effect the selective lacing of the I′ lines coupling conductor elements of the selected cores are connected together by plugging into the respective sockets $S_1$ and $S_2$. The interconnections between plugs and sockets can readily be changed and the programming system thereby made more versatile.

It will be appreciated that other lacing, driving and reading configurations can be employed, and other storage elements e.g., elementary areas on a thin magnetic film, etc.

What we claim is:

1. A digital differential analyser of the time-multiplex type in which a pre-arranged cycle of elementary digital integrations is repeatedly performed, each elementary integration involving the selective addition of an integrand value to a residue of the value of an integral to produce an increment and a new residue, the analyser comprising a first store for signals representing values of integrands, a second store for signals representing values of residues, an array of discrete storage elements arranged in groups, means for interrogating said elements in sequence in groups to produce reproduced signals representing increments in said integrand values, each group corresponding to one integrand and the groups of said array being interrogated in the order of said pre-arranged cycle, means responsive to said reproduced signals and signals representing integrand values derived from said first store to produce signals representing amended integrand values, means for deriving from said second store signals representing values of said residues in said cyclic order, means for combining said derived signals representing residues with signals representing corresponding amended integrand values to produce output signals representing increments in the values of the corresponding integrals, and a plurality of conductors each individual to an elementary integration in said cycle and coupled to different selections of one or more elements in said array which selections correspond to the respective integrations in accordance with the pre-arranged cycle of integrations to be performed by the analyser whereby said output signals cause said selections of elements to store representations of said increments.

2. An analyser according to claim 1 comprising means for applying an output signal produced by the combining means simultaneously to the corresponding selection of storage elements.

3. An analyser according to claim 1 wherein the said array of storage elements comprises an array of static magnetisable cores.

4. An analyser according to claim 3 wherein two or more of the said magnetisable cores are each coupled to a separate conductor element, the said separate conductor elements being connectible together in series to form said conductors according as the signal stored by the magnetisable core associated with each of said conductors is required to participate in a subsequent elementary integration.

5. An analyser according to claim 1 wherein said conductors comprise at least one conductor which is coupled with the storage elements in more than one group according as a particular output signal from the combining means is required to take part in more than one subsequent elementary integration in the pre-arranged cycle of elementary integrations.

6. An analyser according to claim 1 comprising switching means for preselecting different combinations of said storage elements to receive an output signal produced during any elementary integration.

7. An analyser according to claim 6 wherein said switching means comprises an array of couplings, each adapted to couple with one storage element, and manually operable connectors for interconnecting different selections of said couplings.

8. An analyser according to claim 1 comprising a second array of storage elements, said arrays being employed to store output signals representing positive and negative increments respectively.

References Cited in the file of this patent

UNITED STATES PATENTS

| | | |
|---|---|---|
| 2,900,135 | Benaglio et al. | Aug. 18, 1959 |
| 2,924,381 | Eckdahl et al. | Feb. 9, 1960 |
| 3,035,768 | Steele | May 22, 1962 |

OTHER REFERENCES

Braun: Design Features of Current Digital Differential Analyzers, Convention Record IRE, 1954, Part 4, pages 87 to 91.